United States Patent

Lenormand et al.

[11] Patent Number: 5,734,349
[45] Date of Patent: Mar. 31, 1998

[54] HIGH CAPACITY MULTIBEAM ANTENNA WITH ELECTRONIC SCANNING IN TRANSMISSION

[75] Inventors: Régis Lenormand, Blagnac; Bernard Coulomb, L'Union; Jean-Philippe Marre, Seysses; Michel Tatard; Christian Rigal, both of Toulouse; Charles Villemur, Portet sur Garonne, all of France

[73] Assignee: Alcatel Espace, Nanterre Cedex, France

[21] Appl. No.: 587,486

[22] Filed: Jan. 17, 1996

[30] Foreign Application Priority Data

Jan. 18, 1995 [FR] France ............................. 95 00515

[51] Int. Cl.$^6$ ........................................... H01Q 3/22
[52] U.S. Cl. .......................... 342/373; 342/372; 342/371; 342/376
[58] Field of Search ........................ 342/372, 373, 342/374, 371, 376

[56] References Cited

U.S. PATENT DOCUMENTS

| | | | |
|---|---|---|---|
| 3,993,999 | 11/1976 | Hemmi et al. ................. | 343/854 |
| 4,090,199 | 5/1978 | Archer ........................... | 343/100 SA |
| 4,931,802 | 6/1990 | Assal et al. .................... | 342/356 |
| 4,965,587 | 10/1990 | Lenormand et al. | |
| 5,034,752 | 7/1991 | Pourailly et al. .............. | 342/373 |
| 5,038,147 | 8/1991 | Cerro et al. ................... | 342/368 |
| 5,276,452 | 1/1994 | Schuss et al. ................. | 342/371 |

FOREIGN PATENT DOCUMENTS

| | | |
|---|---|---|
| 0340483A1 | 11/1989 | European Pat. Off. . |
| 0420739A1 | 4/1991 | European Pat. Off. . |
| 0488101A1 | 6/1992 | European Pat. Off. . |

*Primary Examiner*—Thomas H. Tarcza
*Assistant Examiner*—Dao L. Phan
*Attorney, Agent, or Firm*—Sughrue, Mion, Zinn, Macpeak & Seas, PLLC

[57] ABSTRACT

The invention provides a multibeam antenna comprising:

an array 11 of $N_e$ elementary sources 31; energy-focusing optical means comprising a reflector 10 or a lens; the array being situated in the focal zone of said focusing means; and a feed and control circuit cooperating with the $N_e$ primary sources 31 to produce $N_b$ beams each generated from a subgroup of the primary sources, some of which are shared between overlapping beams; the feed and control circuit comprising phase shifter means and attenuator means, said means being organized in $N_e$ feed channels for said $N_e$ primary sources, each feed channel including specific means for acting on the phase and the amplitude of an excitation signal in each feed channel;

wherein each required beam is generated by the multibeam antenna solely by acting on the phase and the amplitude of the excitation delivered to each elementary source forming a portion of said beam; and wherein the number of sources $N_i$ contributing to a beam i, $1 \leq i \leq N_b$, varies and is determined as a function of the characteristics desired for said beam i.

The antenna is applicable to satellite telecommunications, in particular for on-board antennas of high capacity.

8 Claims, 8 Drawing Sheets

HIGH CAPACITY MULTIBEAM ANTENNA WITH ELECTRONIC SCANNING IN TRANSMISSION

FIELD OF THE INVENTION

The invention relates to an antenna for telecommunication applications by satellite, and in particular an antenna capable of serving a plurality of areas on the ground (known as "spots") with narrow beams of radiation (known as "spot beams"). More precisely, the antenna of the invention is electronically reconfigurable to be capable of serving needs that may change over time, e.g. concerning the number and/or the direction of the posts, and capable of serving up to about 100 spots simultaneously. The antenna thus comprises a high capacity multibeam antenna with electronic scanning in transmission.

PRIOR ART

Patent application D1=EP-A1-0 333 166 in the name of the Applicant, discloses a multibeam antenna which is electronically reconfigurable in transmission. That document is expressly incorporated in the present application as a description of the prior art. D1 describes an antenna as shown in accompanying FIGS. 1, 2, and 4 and the principle on which it is reconfigured is explained in FIG. 3. That antenna comprises an array 11 of elementary sources; an energy-focusing reflector 10, with the array being situated in the focal zone of the reflector; and feed and control electronics comprising:

m beam-forming circuits (20, 21, ...) that synthesize m beams;

an amplifier stage 22 for receiving the outputs from the beam-forming circuits as combined by means of combiners (not shown), said amplifier stage 22 comprising parallel amplifiers 24 followed by a generalized coupler 26; and a switching circuit 30 which connects the outputs of the amplifier stage to the radiating elements 31 of the array 11.

Figure 3:
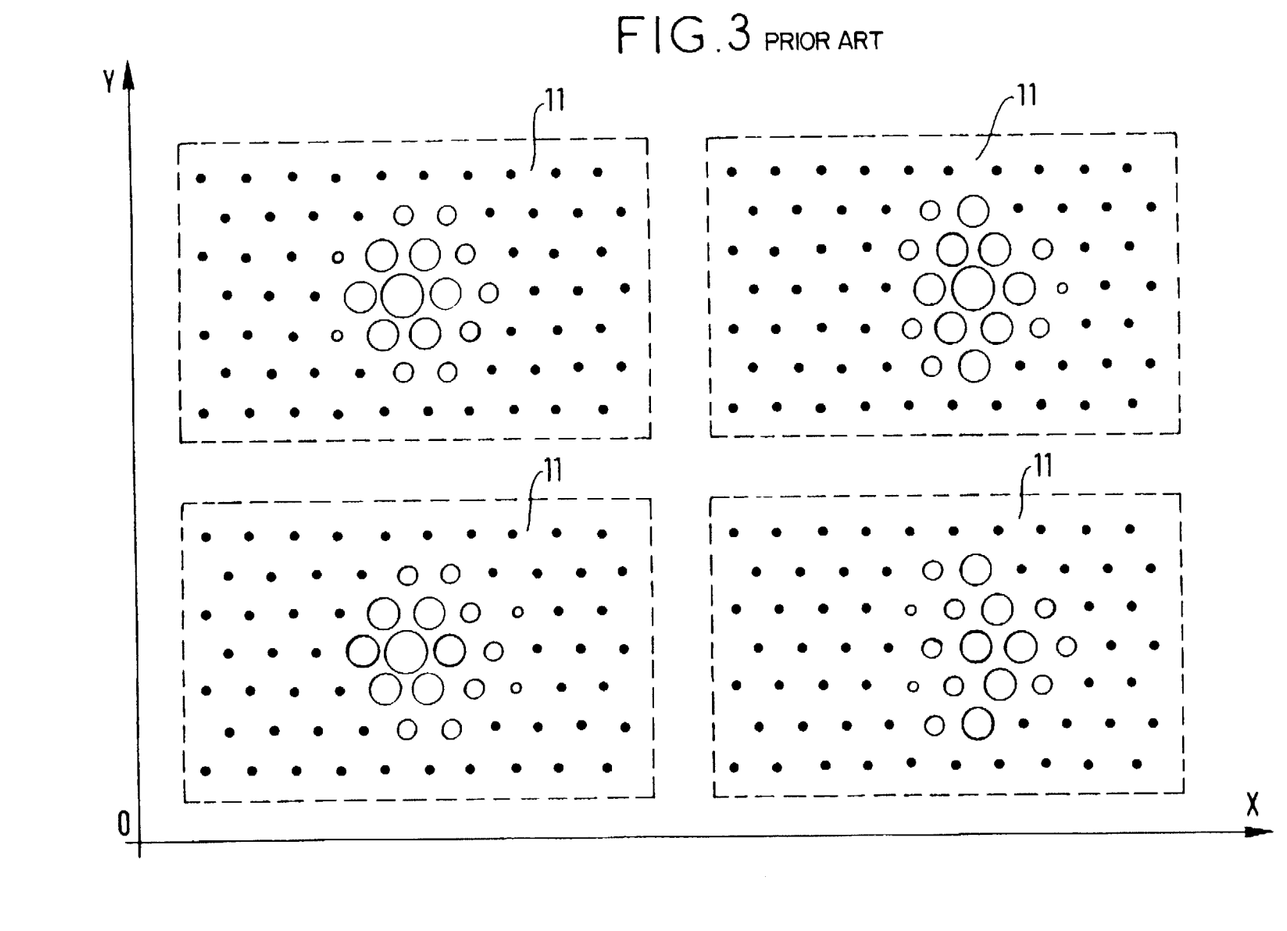
FIG. 3, already mentioned above, gives an example of a plurality of amplitude distributions on displacing beams in two directions OX and OY at the array 11 of sources 31.

The switching circuit enables the antenna to be reconfigured by making it possible to select the positions of the radiating elements that are to be excited by the amplifiers. The principle is shown in FIG. 3 which gives an example of a plurality of amplitude distributions when the beams are displaced in two directions OX and OY at the array 11 of sources 31. The diameters of the disks drawn in FIG. 3 represent the amplitudes of the signals emitted by the various sources 31 in the array 11. The number of active sources is the same for all of the beams; this number is 16 sources per beam in the example of FIG. 3.

Figure 2:
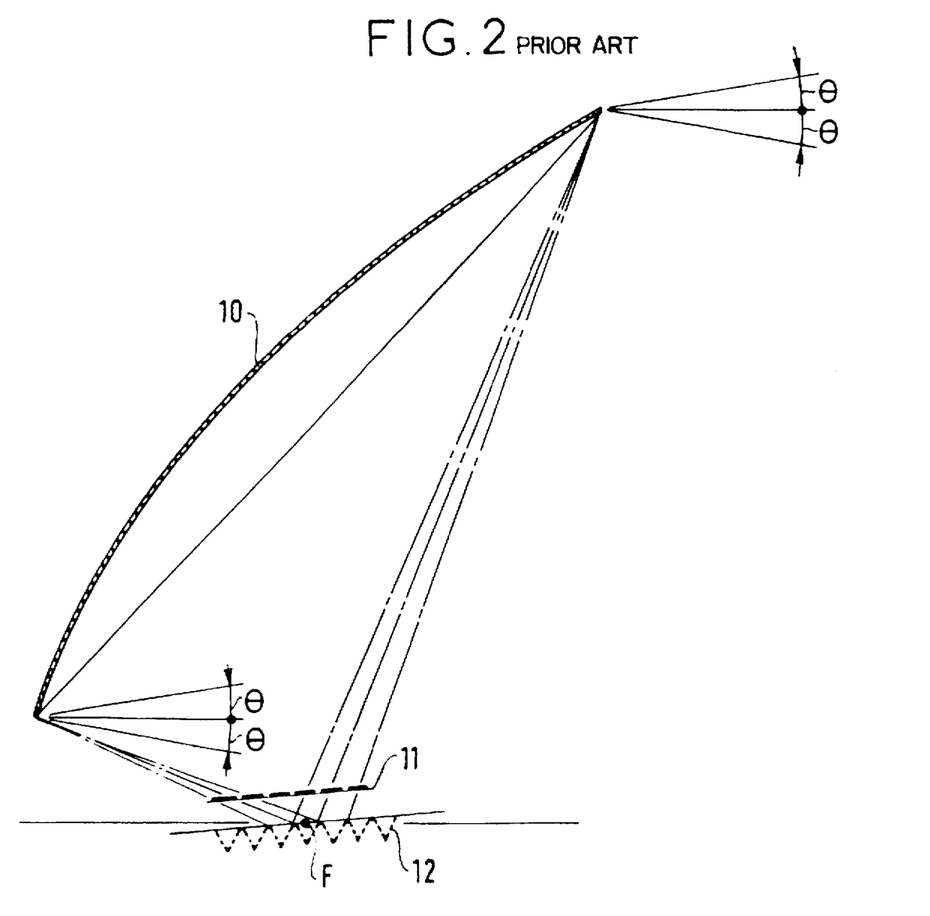
FIG. 2, already mentioned above, is a diagram of an antenna known in the prior art, having a focusing reflector 10 and an array 11 of sources 31 at its focus F.

With reference to FIG. 2, it can be seen that changing the positions of the active sources in the array 11 changes the angle θ in which the beam is pointed relative to the propagation direction, of a virtual source 12 placed exactly at the focus F of the reflector 10, and after being reflected by the reflector. Thus, the direction of the beam, and thus the position of the spot on the ground can be determined by the positions of the active sources 31 within the array 11. The active sources are selected from the set of sources 31 by the above-mentioned switching circuit 30.

Figure 1:
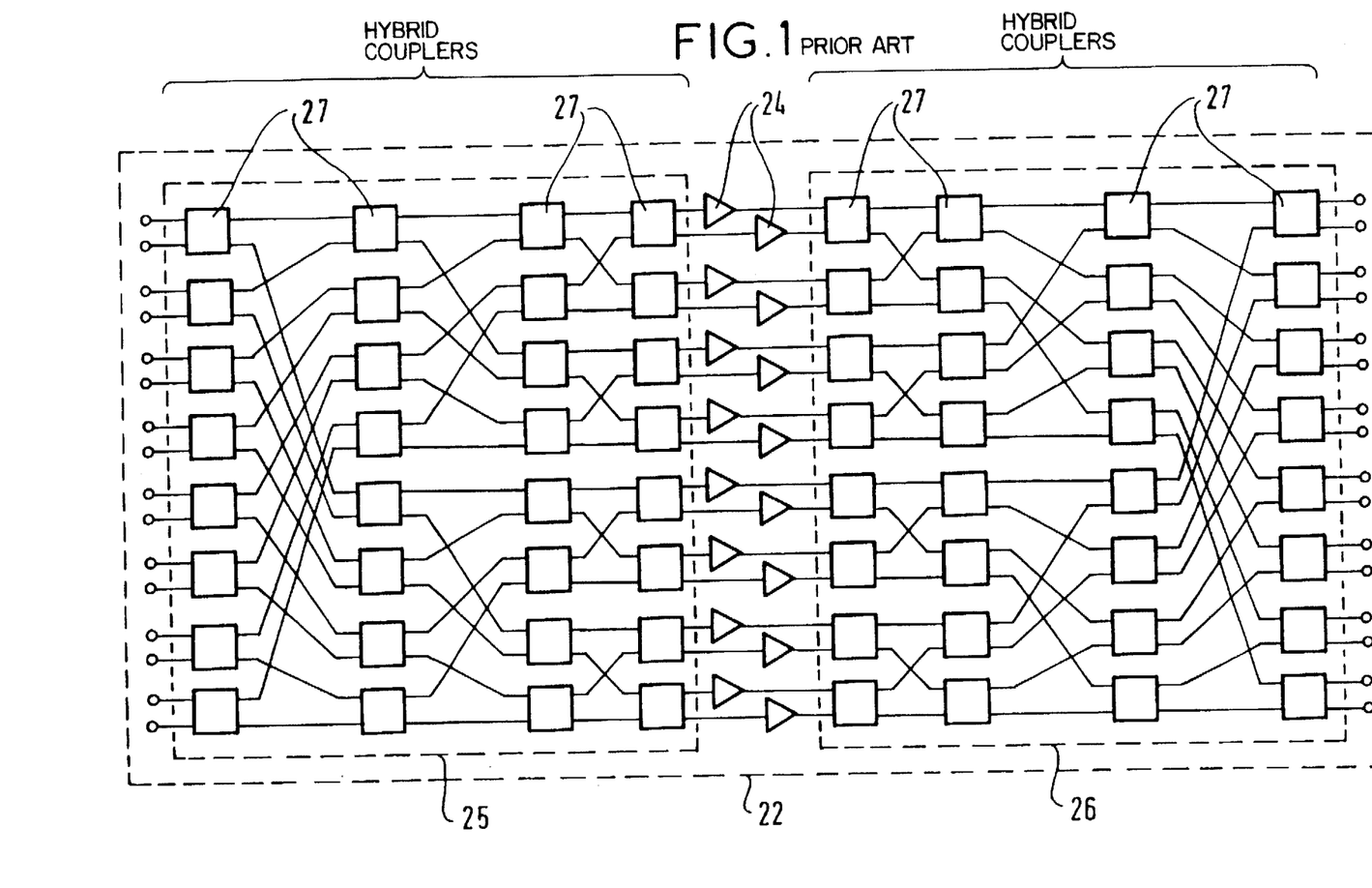
FIG. 1, already mentioned above, is a diagram of an amplification stage 22 known in the prior art, with its matrices of couplers 27 configured as a power divider 25 and as a power combiner 26.

In a preferred embodiment, the beam-forming circuits include adjustable phase shifters (not shown) and adjustable attenuators (not shown) to enable the beam to be synthesized. Advantageously, the amplification stage 22 comprises two generalized couplers 25, 26 on either side of amplifiers 24 that are disposed in parallel, as shown in FIG. 1. Each generalized coupler 25, 26 is formed by an association of hybrid couplers 27 connected in such a manner that each input of the first coupler 25 is distributed over all of the amplifiers and thus over all of the outputs from the hybrid couplers 27 of the first generalized coupler 25. Such a configuration for an amplification stage including generalized couplers is known, e.g. from document D2=U.S. Pat. No. 4,616,831 to S. Egami et al., and assigned to NTT. That document is expressly incorporated in the present application for its description of the prior art.

A quasi-uniform distribution of load is thus obtained over all of the inputs of the amplifiers 24. Thereafter the signals are reconstituted by means of the second generalized coupler 26 whose structure is the inverse of the first, and levels are to be found corresponding to each of the beams, there being two in this case: F1 and F2.

Such an embodiment optimizes the operation of the amplification stage. Each amplifier is fed by components coming from m beams, generated by the m beam-forming circuits (20, 21, ...). In this way, a change in traffic has no impact on the input signal level applied to the amplifiers providing the overall traffic remains constant.

In contrast, moving a source relative to the focus F of the reflector degrades the efficiency of the antenna. Also, transmission effectiveness for the various energy distributions cannot be optimal when the antenna obeys a fixed distribution law. The same applies to phase distribution. The use of adjustable phase shifters and of adjustable attenuators, as mentioned above, makes it possible to achieve optimum synthesis of each elementary source as though it were at the focus F of the reflector 10.

Such operation makes it possible to make an antenna whose gain does not depend on its pointing direction, while keeping the reflector 10 and the array 11 of sources 31 fixed.

That prior art antenna system operates well for a limited number of beams, and for an offset relative to the focus F which is not too great. In contrast, for a large number of different beams, the array 11 of sources 31 takes on large dimensions, and synthesis of some of the beams requires the use of sources 31 that are further and further away from the focus of the reflector 10. That inevitably gives rise to degraded beam characteristics, and in particular with respect to the levels of secondary lobes and thus to possible interference between adjacent beams.

Another antenna system is known in the prior art from document D3=EP-B1-0 417 679 in the name of the Applicant, relating to a multibeam antenna that is steerable by switching at low level. That document is expressly incorporated in the present application for its description of the prior art. According to document D3, each beam is formed from low level signals which are selected by a switching circuit prior to amplification by an amplification stage similar to that described above. D3 thus proposes a multibeam antenna that is steerable by low-level switching, the antenna comprising an energy-focusing reflector 10, an array 11 of elementary sources 31 situated in the focal zone of the reflector so as to synthesize the electromagnetic field in said focal zone, and electronics comprising an amplification stage 22 having n inputs and n outputs, wherein the coverage zone is implemented by n spots each corresponding to a defined number of active elementary sources 31, which number is fixed and the same for all of the beams. The control and feed electronics also includes at least one low-level switch enabling an input to be connected to one of the f outputs of the switch.

In this way, beam switching and signal amplification have better efficiency than in the preceding case. Nevertheless, that configuration leaves much to be desired when the number of sources becomes too great, when the number of spot beams becomes too great, or when the angle between different beam directions becomes too great.

Document D4=EP-B1-0 420 739 in the name of the European Space Agency relates to various devices for powering elementary sources in antennas of the kind described above. That document which is considered by the Applicant as being the document closest to the invention, is expressly incorporated in the present application for its description of the prior art. In column 4, lines 19 to 23, Document D4 mentions difficulties in making hybrid coupler matrices of large dimension as limiting the number of elementary sources to eight or at most to sixteen. Various embodiments are proposed for getting round that difficulty, with examples relying on the use of multiple matrices in each device for powering elementary sources.

According to the teaching of document D4, each beam uses all of the amplifiers, which are uniformly loaded, and at least one source in each group, i.e. at least one source fed from each matrix in a plurality of matrices.

In all of the embodiments of D4 (see column 8, for example), the number of sources per beam is fixed and the same for all of the beams in a given embodiment. Once again, that configuration leaves much to be desired when the number of sources becomes too great, when the number of spot beams becomes too great, or when the angle between different beam directions becomes too large.

Document D5=EP-A1-0 422 551 in the name of the Applicant describes another antenna similar to those described above. That document is expressly incorporated in the present application for its description of the prior art. Document D5 teaches the use of the same number of sources for each beam, but under the condition that the coverage zone implemented by a plurality of adjacent spots is covered partially and simultaneously by one or more beams having independent accesses, and for this purpose the same number p of elementary sources (or groups of sources) are used, each selected from p classes of sources which are never used simultaneously in the same beam, such that at any instant only one elementary source belonging to a given class is used, with source switching ensuring agility for the beam(s).

By constraining the spots to use the same number of active sources and by limiting control of the sources, e.g. to phase control (all sources having the same amplitude weight), an antenna of limited performance is obtained. In contrast, the architecture of the subsystem is simplified. That solution represents a compromise that is acceptable if the number of beams is not very great. If the number of beams is great, then the performance of the antenna is compromised.

OBJECTS AND SUMMARY OF THE INVENTION

For the present invention, we envisage synthesizing about one hundred beams at least, selected from a set of options that may have as many as several hundreds of options, all achievable using a single antenna architecture and its feed (designed in accordance with the invention).

None of the solutions known in the prior art appears to be capable of being implemented on such a scale of complexity, at least while also satisfying the constraints of being suitable for embarking on a space platform (constraints concerning weight, reliability, bulk, . . . ), and with performance that is acceptable for about one hundred beams.

An object of the invention is thus to mitigate the drawbacks of the prior art in order to implement a high capacity multibeam antenna with electronic scanning in transmission, and that is capable of providing about one hundred beams.

To this end, the invention provides a multibeam antenna comprising:

an array 11 of $N_e$ elementary sources 31;

energy-focusing optical means comprising a reflector 10 or a lens;

the array being situated in the focal zone of said focusing means:

and a feed and control circuit co-operating with the $N_e$ primary sources 31 to produce $N_b$ beams each generated from a subgroup of the primary sources, some of which are shared between overlapping beams;

the feed and control circuit comprising phase shifter means and attenuator means, said means being organized in $N_e$ feed channels for said $N_e$ primary sources, each feed channel including specific means for acting on the phase and the amplitude of an excitation signal in each feed channel;

wherein each required beam is generated by the multibeam antenna solely by acting on the phase and the amplitude of the excitation delivered to each elementary source forming a portion of said beam; and wherein the number of sources $N_i$ contributing to a beam i, $1 \leq i \leq N_b$, varies and is determined as a function of the characteristics desired for said beam i.

According to a characteristic, said attenuation means are adjustable attenuators serving to act on amplitude in each channel, and enabling amplitude to be adjusted continuously between a maximum amplitude and zero amplitude whenever the channel concerned is not required to contribute to a given beam i.

In an advantageous embodiment, said feed circuit comprises a plurality P of power-divider matrices of order $M_j$ constituted by elementary hybrid couplers, and all of the outputs of the P matrices which are connected to the elementary sources are connected by connections which are as interlaced as possible.

In a particular embodiment, said feed circuit comprises P=4 power-divider matrices of order $M_j=16$, with all of the outputs thereof being connected to the $N_e=64$ elementary sources making up said array.

BRIEF DESCRIPTION OF THE DRAWINGS

Other advantages and characteristics of the invention appear from the following detailed description and the accompanying drawings which are given by way of non-limiting example and which show embodiments of the invention or some of the main characteristics thereof, and in which.

In all of the figures, the same references designate the same elements; scale is not always complied with for reasons of clarity in each drawing.

MORE DETAILED DESCRIPTION

An antenna of the invention is made in application of technology that is known and illustrated by FIGS. 1 to 4 which show embodiments known in the prior art.

Thus, the antenna of the invention comprises an array 11 of $N_e$ elementary sources 31; optical means forming a reflector 10 or a lens serve to focus energy; the beam being situated in the focal zone of said focusing means, as shown in FIG. 2.

Figure 4:
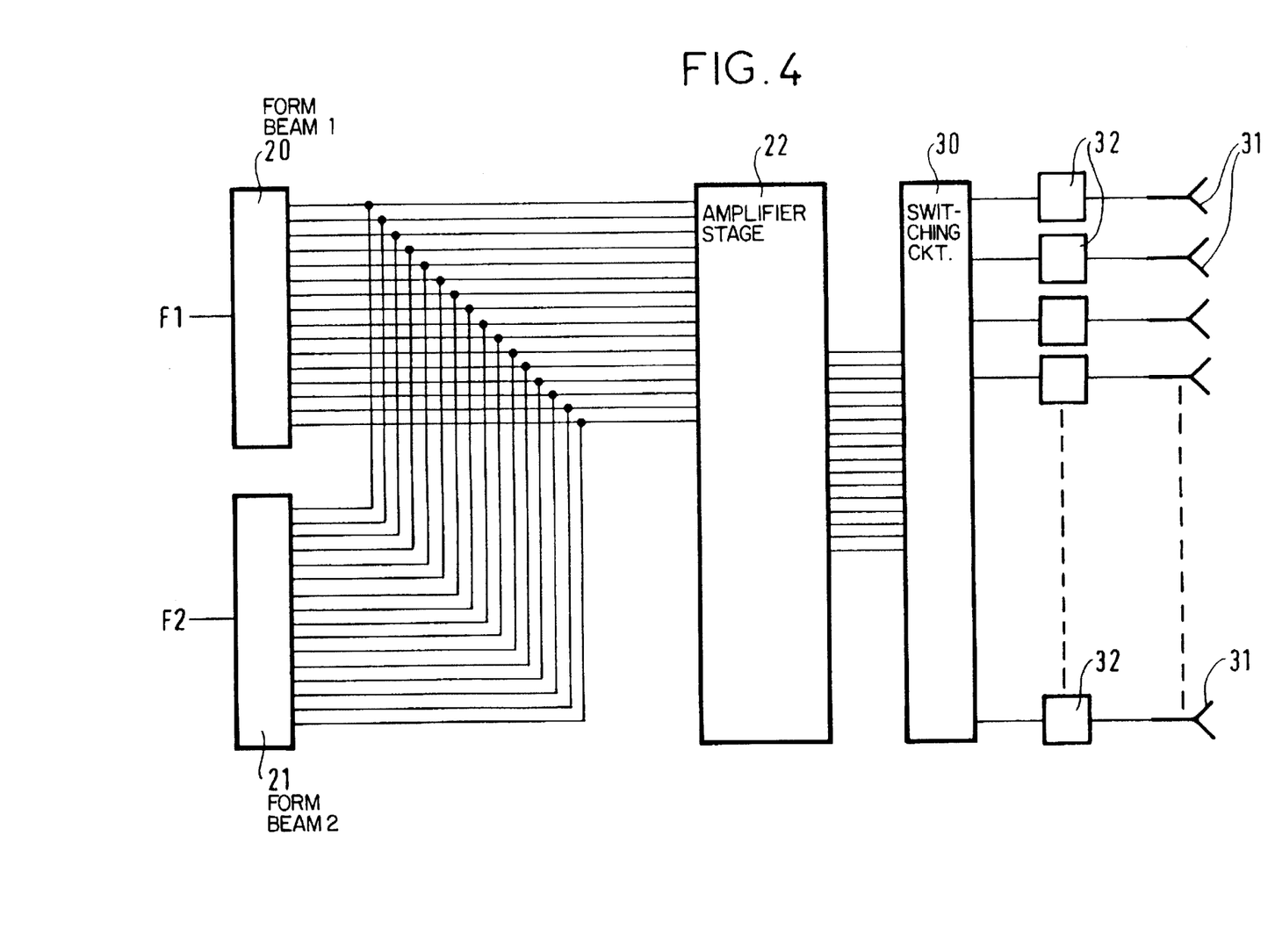
FIG. 4 is a diagram of a feed and control circuit known in the prior art and suitable for two beams F1 and F2.
Figure 5:
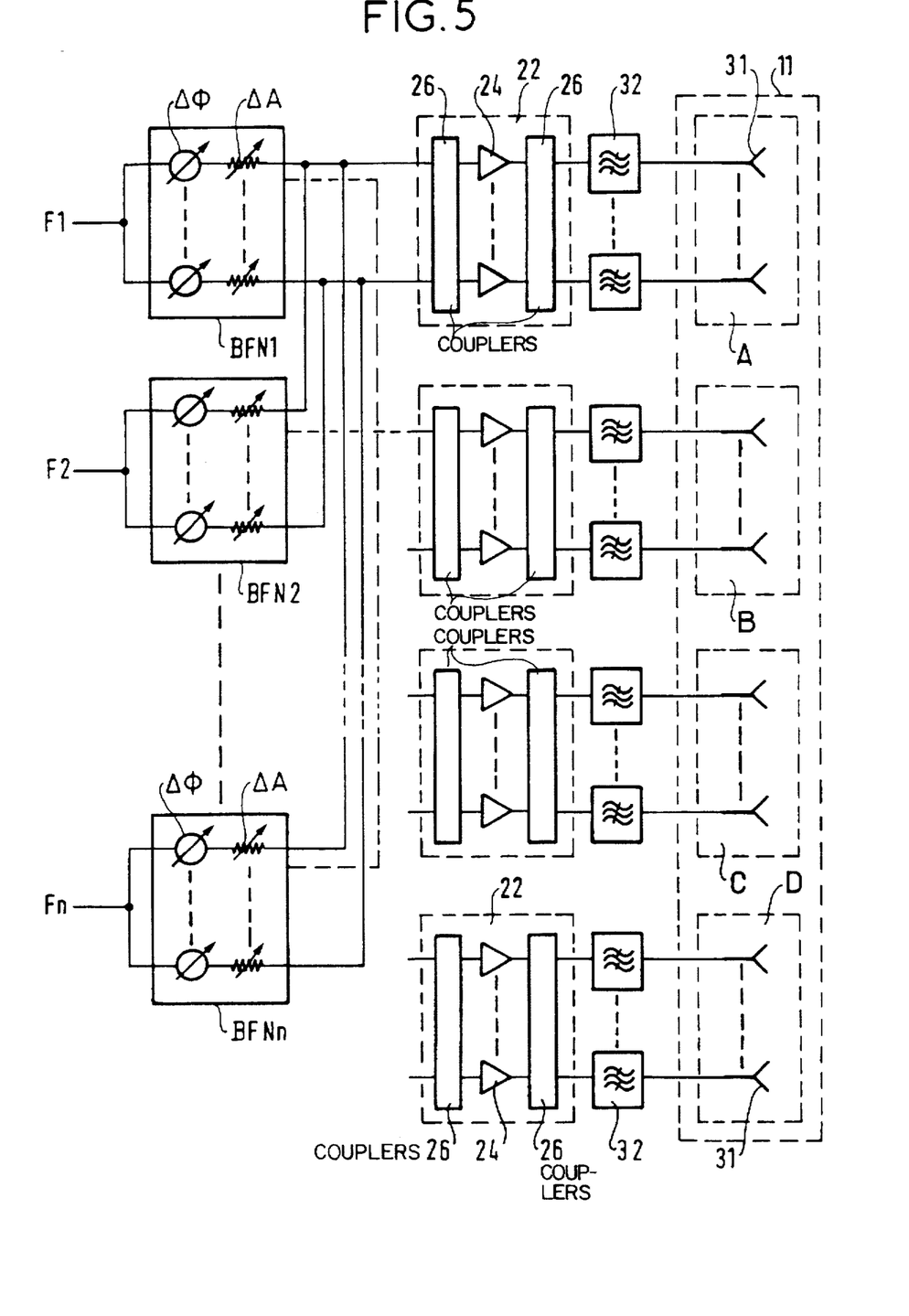
FIG. 5 is a diagram of a feed and control circuit for Fn simultaneous beams suitable for integration in the antenna of the invention.

The antenna of the invention also comprises a feed and control circuit that co-operates with said $N_e$ primary sources 31, which circuit may be similar to that shown in FIG. 4, for example. A particular embodiment of such a circuit is shown in FIG. 5 which is described below. The amplification stage used in the feed and control circuit of the invention may be as shown in FIG. 1, or in a particular embodiment, it may comprise a plurality of amplification blocks as shown in FIG. 1. In the present state of manufacturing such matrices, the maximum achievable size is a 16×16 matrix, so for a larger number of elementary sources, it is necessary to make use of a plurality of matrices in which the dimension of each matrix does not exceed 16×16.

The feed and control circuit also includes phase shifter means Δφ and attenuator means ΔA (not shown in FIG. 4 but shown explicitly in the example of FIG. 5). In FIG. 5, it can be seen diagrammatically that each beam F1, F2, . . . , Fn is synthesized by a respective beam-forming network BFN1, BFN2, . . . , BFNn. More precisely, the signal to be conveyed in each respective beam is applied to the input of each BFN, in which the phase shifts and attenuations required for synthesizing the respective beam are applied to the respective signal via adjustable phase shifters Δφ and adjustable attenuators ΔA. A BFN is an array of adjustable phase shifters and of adjustable attenuators, in this case comprising 64 attenuators and 64 phase shifters per BFN, which corresponds to the maximum number of antenna sources 31 in this example. Each BFN thus has 64 outputs in this example.

The 64 signals coming from each of the n BFNs are combined by combiners (not shown) and applied to a 64-channel amplification stage. In a practical embodiment, as shown in FIG. 5, the 64-channel amplification stage is made up of four amplification blocks 22 each having 16 channels, of the kind shown in FIG. 1. As in the prior art, it is advantageous to interpose generalized first and second couplers 25 and 26 each formed by an association of hybrid couplers 27 located on either side of amplifiers 24 so that each input of the first coupler is distributed over all of the amplifiers and thus over all of the hybrid coupler outputs of the first generalized coupler 25.

This ensures substantially uniform loading of all of the inputs of the amplifiers 24 within a given amplification block 22. Thereafter, the signals are reconstituted by means of a second generalized coupler 26 whose structure is the inverse of the first, so as to retrieve the levels corresponding to each of the beams F1, F2, . . . , Fn. The 64 amplified channels are then conveyed by a bank of bandpass filters 32 to the radiating elements 31 which are 64 in number.

These 64 elements are naturally subdivided into four groups A, B, C, and D each having 16 elements and corresponding to the respective amplification blocks. In a preferred embodiment of the invention, the elements of each group A, B, C, and D are as mixed together as possible as to disposition within the array 11 of sources 31. That is to say that the elements of the various groups are disposed in such a manner that an element of a given group is not directly in the vicinity of any other radiating element in the same group. Two examples of such dispositions are given in FIGS. 6 and 7. Such dispositions make it possible to retain the advantages of a single amplification stage, in spite of the number of amplification blocks required for feeding a large number of sources.

Figure 6:
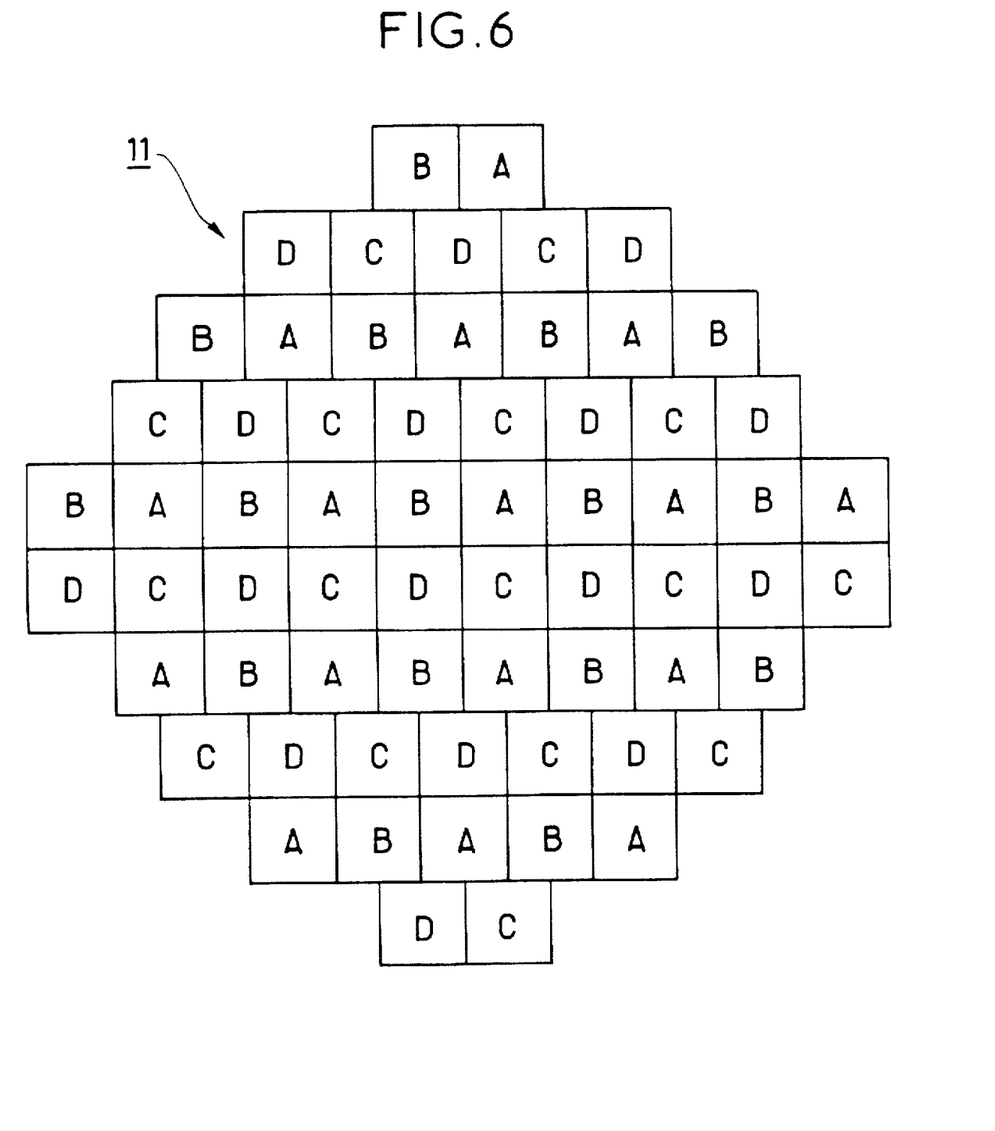
FIG. 6 is a diagram of a first example of an array 11 of $N_e=64$ elementary sources 31 belonging to four groups (A, B, C, and D) disposed in compliance with a characteristic of the invention.

In FIG. 6, there can be seen an example in application of a characteristic of the invention in which the 64 elementary sources 31 are disposed in quasi-rectangular manner over an array 11 designed to be located in the focal plane of a focusing reflector 10. The sources fed from each group A, B, C, and D are identified by the corresponding letter. It can be seen that no source in any given group is disposed adjacent to another source of the same group. The circuits of the connections between the four matrices having sixteen outputs each and the elementary source 31 shown in FIG. 6 are thus as thoroughly interlaced as possible. This interlacing can be achieved by using coaxial transmission lines, for example, thus making it possible to conserve the phases imparted by the phase shifters of the BFNs, providing the lengths of the respective radio propagation paths are complied with.

Figure 7:
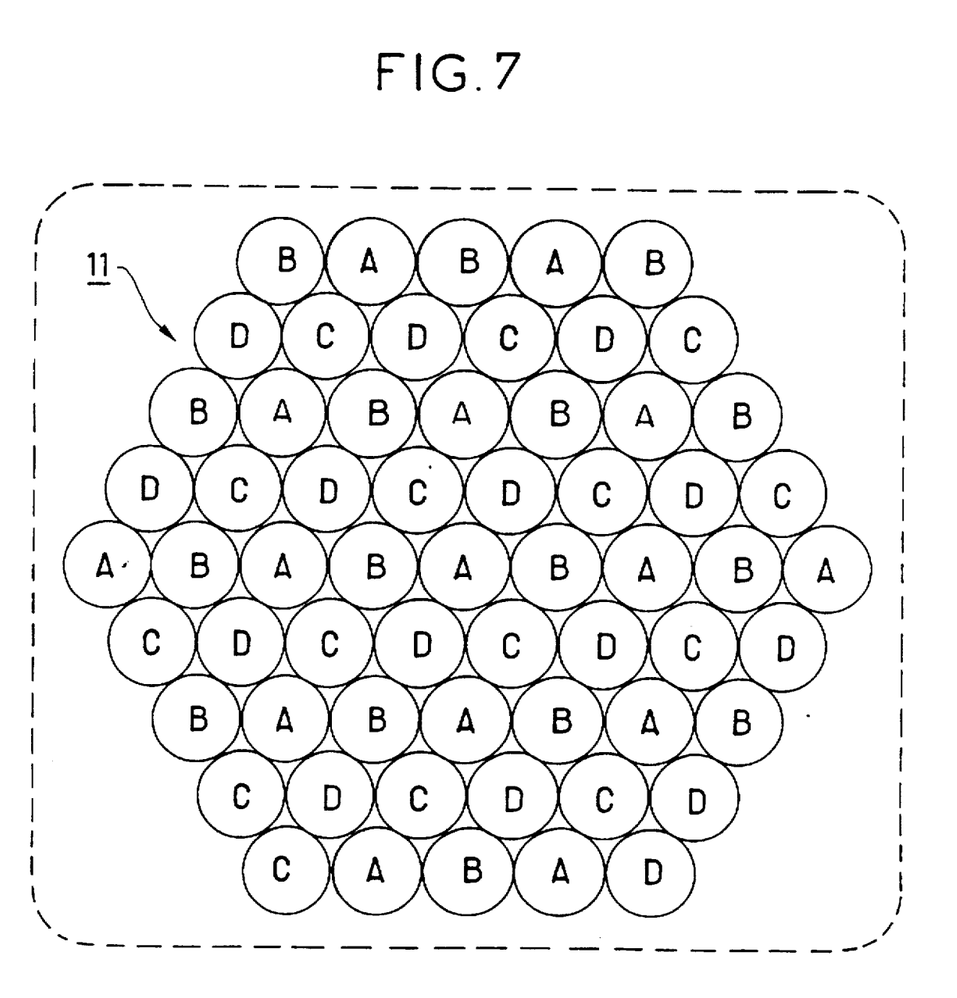
FIG. 7 is a diagram of another example of an array 11 of $N_e=61$ elementary sources 31 belonging to four groups (A, B, C, and D) disposed in compliance with a characteristic of the invention.

In FIG. 7, there can be seen another example in application of a characteristic of the invention, in which 61 elementary sources 31 are disposed in a hexagonal array 11 for positioning in the focal plane of a focusing reflector 10. The sources fed from each group A, B, C, and D are identified by the corresponding letters. Three outputs of the four 16-channel amplification stages are not used, and they are terminated on match loads (one output per amplification stage). There are thus 15 sources for each of the groups A, C, and D, and 16 sources for the group B. It can be seen that no source in any given group is disposed adjacent to another source in the same group. The connection circuits between the four output matrices of the amplification blocks and the elementary sources 31 shown in FIG. 7 are thus as interlaced as possible.

Figure 8:
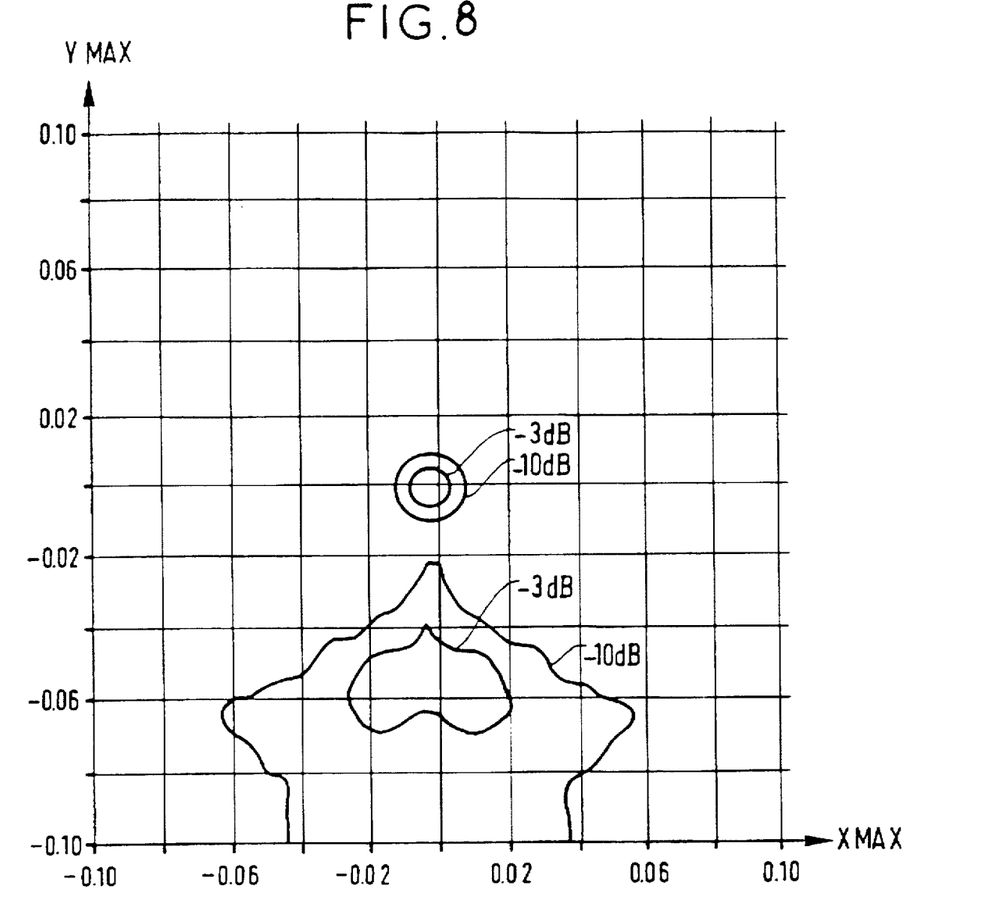
FIG. 8 is a diagram showing iso-power contours at −3 dB and at −10 dB in the focal plane of the antenna for pointing on the axis (0°) and for pointing off axis with θ=20°.

FIG. 8 is a diagram showing the −3 dB and −10 dB iso-power contours in the focal plane of the antenna of the invention for pointing on the axis (0°) and for pointing off axis at an angle θ=20°. If it is assumed that the elementary sources 31 are uniformly distributed in an array 11 in a disposition of the kinds described above, then it can be seen how advantageous the invention is for synthesizing beams that are considerably off-axis.

In this figure, it can be seen that the energy distribution required for synthesizing a beam that is directed off-axis at an angle θ=20° is relatively spread out and requires a relatively large number about 16 elementary sources), or more, in order to obtain proper synthesis.

In contrast, it can be seen in this figure that the energy distribution required for synthesizing a beam directed on the axis is very compact, and therefore requires only a small number of sources, which may be of the order of four to eight in the example shown.

The main characteristic of the invention, i.e. that the number of sources $N_i$ contributing to a beam i varies and is determined as a function of the characteristics desired for said beam i, shows how advantageous it is for implementing radiation patterns corresponding to these two spots. On the contrary, if the same number of sources are used for synthesizing both spots, then the quality of synthesis is greatly degraded, which has a direct and harmful incidence on the efficiency of the antenna.

The various examples described above are given to illustrate the principles of the invention and some of its main characteristics in non-limiting manner. The person skilled in the art will know how to implement these principles in numerous embodiments without thereby going beyond the ambit of the invention.

In particular, the main characteristic of the invention can be combined with the characteristics of known embodiments, e.g. those mentioned in above documents D1 to D5. Thus, an even higher number of elementary sources may be used, in conjunction with a switching circuit as described in document D1. Alternatively, beam pointing can be obtained by low-level switching as taught in document D3. All imaginable configurations of the feed and control circuits can be combined with the characteristics of the invention, and in particular this can be done for all of the configurations enumerated in document D4. Even the characteristics of document D5 can be combined with the invention, with the natural exception of constraints on the number of sources contributing to each beam.

All the above combinations and many others can easily be imagined by the person skilled in the art without going beyond the ambit of the present invention for which the sort-after scope is specified in the following claims.

We claim:

1. A multibeam antenna comprising:

an array of $N_e$ elementary sources;

energy-focusing optical means comprising a reflector or a lens, the array being situated in the focal zone of said energy-focusing optical means; and a feed and control circuit co-operating with the $N_e$ elementary sources to produce $N_b$ beams each generated from a subgroup of the elementary sources, some of which are shared between overlapping beams, the feed and control circuit comprising phase shifter means and attenuator means, said phase shifter means and attenuator means being organized in $N_e$ feed channels for said $N_e$ elementary sources, each feed channel including specific means for acting on the phase and the amplitude of an excitation signal in each feed channel, wherein each of said beams is generated by the multibeam antenna solely by acting on the phase and the amplitude of the excitation signal delivered to each elementary source forming a portion of said beam, and wherein the number of sources $N_i$ contributing to a beam i, $1 \leq i \leq N_b$, varies and is determined as a function of the characteristics desired for said beam i.

2. The antenna according to claim 1, wherein said attenuator means are adjustable attenuators serving to act on an amplitude of the excitation signal in each channel, and enabling the amplitude to be adjusted continuously between a maximum amplitude and zero amplitude as a function of whether or not the channel is required to contribute to a given beam i.

3. An antenna according to claim 1, wherein said feed circuit comprises a plurality P of power-divider matrices of order $M_j$ constituted by elementary hybrid couplers, and all of the outputs of the P matrices which are connected to the elementary sources are connected by connections which are as interlaced as possible.

4. An antenna according to claim 1, wherein said feed circuit comprises P=4 power-divider matrices of order $M_j=16$, with all of the outputs thereof being connected to the $N_e=64$ elementary sources making up said array.

5. The antenna according to claim 1, wherein said feed and control circuit further comprises an amplifier stage comprising a plurality of amplifier blocks, each of said amplifier blocks receiving excitation signals from ones of said feed channels and providing amplified excitation signals to a subarray of said array of elementary sources, wherein elementary sources of each subarray are interlaced with elementary sources of other subarrays.

6. The antenna according to claim 5, wherein said array of elementary sources is arranged in a plurality of rows, wherein elementary sources of a subarray are disposed in alternating rows.

7. The antenna according to claim 5, wherein elementary sources of a subarray are arranged such that all elementary sources adjacent to each of the elementary sources of said subarray are from other subarrays.

8. The antenna according to claim 5, wherein each of said amplifier blocks includes: a first coupler matrix for substantially uniformly distributing the power of input excitation signals received by said amplifier block; a plurality of amplifiers for receiving and amplifying the signals output from said first coupler matrix; and a second coupler matrix for combining the signals amplified by said amplifiers to produce amplified excitation signals which correspond to the input excitation signals.

* * * * *